Feb. 11, 1969  O. E. SEAY  3,427,652

TECHNIQUES FOR DETERMINING CHARACTERISTICS OF
SUBTERRANEAN FORMATIONS

Filed Jan. 29, 1965

INVENTOR
ORUM E. SEAY

BY Burns, Doane, Benedict,
Swecker & Mathis
ATTORNEYS

United States Patent Office 3,427,652
Patented Feb. 11, 1969

3,427,652
TECHNIQUES FOR DETERMINING CHARACTERISTICS OF SUBTERRANEAN FORMATIONS
Orum E. Seay, Duncan, Okla., assignor to Halliburton Company, Duncan, Okla., a corporation of Delaware
Filed Jan. 29, 1965, Ser. No. 429,044
U.S. Cl. 166—250                          7 Claims
Int. Cl. E21b 47/00, 43/26

ABSTRACT OF THE DISCLOSURE

A method of evaluating the characteristics of subterranean formations where the period of oscillation of resonating fluid in a well is measured and a well characteristic determined as a function of this measured period of oscillation.

---

Figure 1:
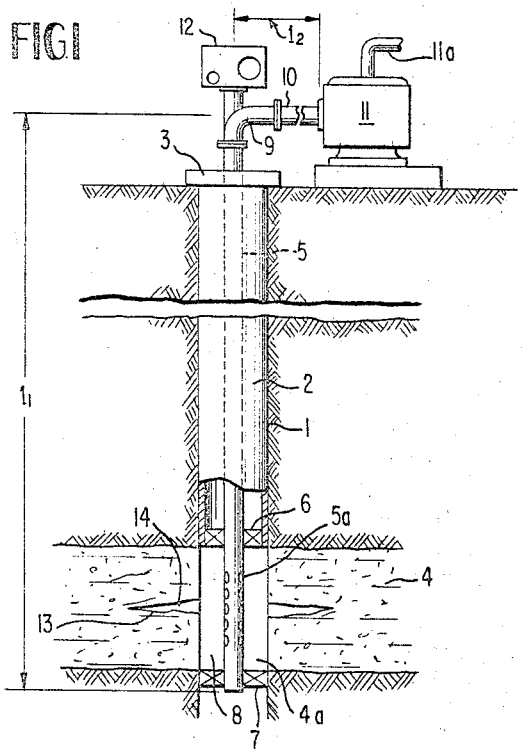

This invention relates to techniques for determining characteristics of subterranean formations. In particular, it pertains to methods for predicting and evaluating information relating to the fracturing of subterranean formations.

BACKGROUND OF THE INVENTION

In recent years there has been developed a technique for improving the productivity of wells and, in particular, oil wells, This technique entails the injection of fluid under high pressure into a well bore in communication with a formation, the productivity of which formation is desired to be increased. Sufficient pressure is applied to this fluid to cause fracturing of the formation. After the initial fracturing has occurred, a decrease in fluid pressure within the well will result. Thus, if it is desired to extend the originally created fracture, it is necessary to again raise the pressure of fluid within the system.

As a general rule, it is desirable to minimize the amounts of fluid which are injected into a well to cause formation fracturing. Such minimization of fluid injection is desirable in order to economize on the volume of fracturing fluid so as to reduce the costs of fracturing operations. It is also desirable in order to minimize the extent to which a formation is infiltrated by foreign fluids.

After one or more fracturing operations have been performed within a well, it is desirable to be able to evaluate the extent to which formation zones have actually been fractured while the fracture equipment, i.e. surface pumps, etc., is still conveniently available and before production equipment is reinstalled or initially installed in the well.

SUMMARY OF INVENTION

In recognition of the foregoing criteria, it is an object of the present invention to provide methods by means of which one or more characteristics of a subterranean formation may be determined.

It is a further object of the invention to provide such methods by means of which data obtained in connection with formation fracturing in some wells may be employed to predict, with reasonable certainty, economical amounts of fluid which should be injected into other wells to cause the desired extent of formation fracturing.

It is also an object of the invention to provide such methods by means of which the extent of fracturing within the subterranean formations may be effectively evaluated.

It is a related object of the invention to provide such methods which enable the convenient evaluation of formation fracturing operations with relatively simple procedures.

Yet another object of the invention is to provide such methods by means of which the extent of relative fracturing in separate zones within a well may be evaluated and compared.

It is also an object of the invention to provide methods by means of which intercommunication between formation zones may be determined.

One method involved in this invention pertains to a technique for enlarging fractures in a subterranean formation in such a fashion as to minimize the amount of fracturing fluid which is injected into a well. In this method a body of fluid is provided which extends upwardly from and communicates with fluid in a formation fracture. A pressure impulse is imparted to fluid in this body to cause oscillation thereof. The fluid in the body is allowed to oscillate without interference, i.e., resonate. The period of oscillation of the resonating fluid is then measured. Thereafter, a volume of fluid determined as a function of the measured period of oscillation of the resonating fluid is injected into the well in communication with the fluid body and under pressure of a magnitude estimated as being sufficient to cause the enlargement of the formation fracture.

Implicit in the fracture enlargement method described above is a novel method for determining the amount of fluid to be introduced into a well to enlarge at least one formation fracture. In this method the amount of fluid is determined as a function of the aforesaid measured period of oscillation.

Another method presented through this invention relates to a technique for predicting relationships between vertically spaced zones of subterranean formations which have been subjected to fracturing pressure. In this technique, a body of fluid is provided in a well so as to extend at least in part upwardly from and communicate with a first, subterranean formation zone. Pressure is applied to fluid communicating with the first zone of a magnitude estimated as being sufficient to cause fracturing of the first zone. A pressure impulse is imparted to fluid communicating with the first zone so as to cause oscillation thereof. This fluid is then allowed to resonate and the period of oscillation of the resonating fluid communicating with the first zone is measured. A body of fluid is then provided which extends upwardly from and communicates with a second, subterranean formation zone. This second zone is vertically spaced from the first zone in the well. The body of fluid communicating with the second zone is isolated from direct contact with the first zone in the well. Pressure is applied to the fluid communicating with the second zone of a magnitude estimated as being sufficient to cause fracturing of the second zone. A pressure impulse is applied to this fluid to cause oscillation thereof. The fluid communicating with the second zone is then allowed to resonate and the period of oscillation of the resonating fluid measured. The relationship of fracturing in the first and second zones is then determined as a function of the relation between the measured periods of oscillation of fluid communicating with the first and second zones respectively.

Still another method presented through this invention entails a technique for evaluating the success of the initial phase of a fracturing operation. In this technique a body of fluid is provided which extends upwardly from and communicates with a formation to be fractured. A pressure impulse is imparted to this fluid to cause oscillation thereof. The fluid is then allowed to resonate and the period of oscillation of the resonating fluid measured. A quantity of fluid is then injected into the well in communication with the fluid body and under pressure of a magnitude estimated as being sufficient to cause fracturing of the formation. A pressure impulse is again imparted to the fluid communicating with the formation to cause oscillation of this fluid. The fluid is allowed to resonate and the period of oscillation of the resonating fluid is measured. The extent of fracturing of the formation or the existence of fracturing in the formation is then determined as a function of the relation between the first and second measured periods of oscillation.

A somewhat similar technique involved in this invention pertains to the evaluation of attempts to enlarge formation fractures. In this technique, the periods of oscillation of resonating bodies of fluid communicating with a fracture zone are measured before and after fracture enlargement operations. The extent or existence of fracture enlargement is then determined as a function of the periods of oscillation of the fluid bodies measured before and after the fracture enlarging operation.

As will be thus appreciated, a basic method common to all of the previously described aspects of the invention entails the determining of characteristics of a formation as a function of one or more measured periods of oscillation of resonating fluid which communicates with the formation.

DRAWINGS

In describing the invention, reference will be made to preferred methods and operating techniques described in connection with appended, schematic drawings.

Figure 3:
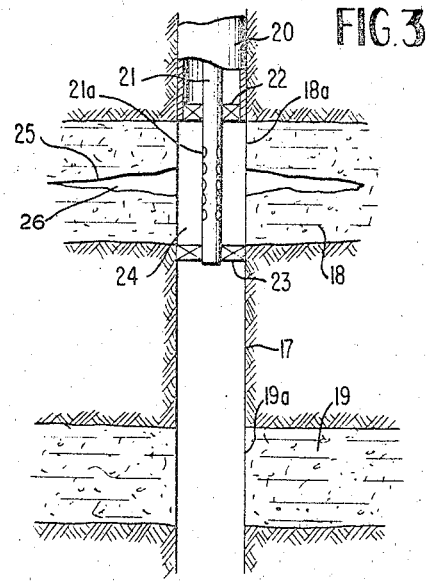
Figure 2:
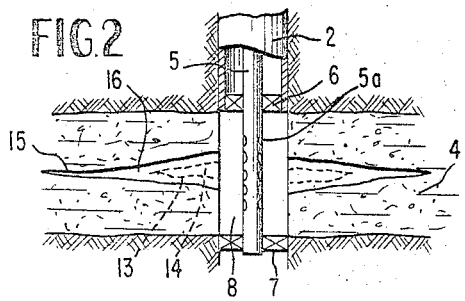
Figure 4:
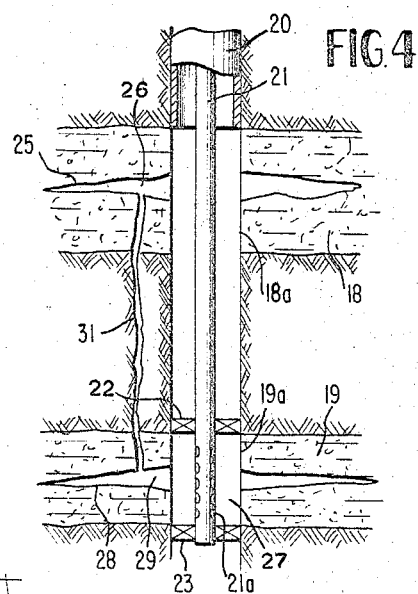
Figure 5:
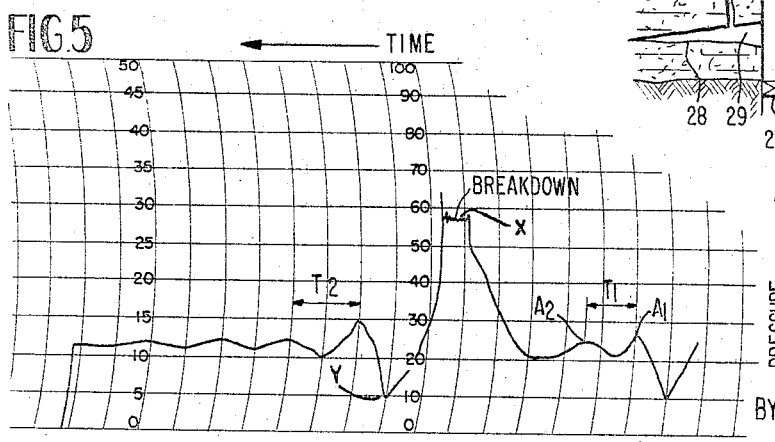

In the drawings:

FIGURE 1 schematically illustrates a well and a formation fracturing system;

FIGURE 2 schematically illustrates the FIGURE 1 well after a fracture shown in FIGURE 1 has been enlarged;

FIGURE 3 schematically illustrates a portion of a well bore including a plurality of formation zones and shows one such zone subsequent to the completion of a fracturing operation;

FIGURE 4 illustrates the well bore portion shown in FIGURE 3 subsequent to the fracturing of a second formation zone; and FIGURE 5 illustrates a portion of a recording of pressure fluctuations in a body of fluid communicating with a formation fracture zone.

FIGURE 1 schematically illustrates a conventional well bore 1 which has been provided with conventional casing 2 extending from a well head 3 downwardly to the upper portion of a formation 4 to be fractured. A well conduit string 5 having a closed lower end extends downwardly from the well head 3 and communicates with an exposed, annular, well bore face 4a of the formation to be fractured. Conduit string 5 is perforated or otherwise provided with apertures 5a adjacent the formation face 4a to provide such communication.

Vertically spaced, conventional packers 6 and 7 extend outwardly from the outer periphery of the string 5 so as to define an isolated annular zone 8. As shown in FIGURE 1, the outer lateral surfaces of packers 6 and 7 sealingly engage the well periphery at the top and bottom, respectively, of the formation face 4a. As will be appreciated, packers 6 and 7 may be of the detachable "hook-wall" type so as to enable them to be selectively engaged and disengaged from the well periphery when the string 5 is being installed or removed from the well bore. As will be further apparent, with the packers 6 and 7 expanded laterally so as to define the isolated zone 8, the formation 4 is placed in communication with the interior of the conduit string 5 and is isolated from the remainder of the well bore interior.

The well head 3 and well conduit string 5 may be connected by conventional coupling means 9 with surface conduit means 10. Conduit means 10 may be of the same internal diameter as conduit string 5 and extends to a conventional, high pressure, piston-type pump 11 of the type conventionally used in oil fields for fracturing operations. Pump 11 applies pressure to fluid by means of one or more reciprocating pistons. As will be apparent, this applied pressure is oscillating in character.

As will be understood, fracturing fluid is made continuously available to the pump means 11 so as to maintain the pump means 11 and the fracture system including the interior of the conduit means 10 and 5, the annular well bore space 8, and any existing fracture space with the formation 4, fully occupied by fluid. As schematically shown in FIGURE 1, fracturing fluid may be made continuously available to the pump means 11 through a supply conduit 11a extending from a conventional source or reservoir of fracturing fluids.

During a fracturing operation, the interconnected conduit means 10 and 5 will be entirely filled with a body of fracturing liquid which extends upwardly from and communicates with fracturing fluid contained within the annular space 8. The fracturing fluid in the annular space 8, of course, directly communicates with the face 4a of the formation to be fractured.

In the system shown in FIGURE 1, which is typical of fracturing systems, the body of fracturing fluid which extends upwardly from the fracture zone is of circular cross section and is contained partially within the well by conduit means 5, with a minor portion being exterior of the well in the conduit means 10.

In order to measure the period of oscillation of pressure fluctuations of fluid within the conduit means 5 and 10, for purposes to be hereinafter described, a conventional, commercially available pressure recorder 12 may be mounted at the well head. As schematically shown for the purposes of example only in FIGURE 1, the recorder 12 may be mounted upon the conduit means 10.

Recorder 12 may include pressure indicating means such as a bellows, not shown, positioned within the interior of the conduit 10 and immersed in fracturing fluid. This bellows, through conventional linkage arrangements or other force-transmitting means, may be connected with a stylus or other recording means so as to provide a mechanism for recording the fluctuations of pressure within the fracturing fluid. Such pressure recording means may be engaged with a continuously moving chart, the rate of movement of which is constant. This chart, as shown in FIGURE 5, may be appropriately calibrated so as to provide a continuous record of pressure changes within the fracturing fluid on a time scale.

Initiation of fracturing

With the arrangement shown in FIGURE 1 and with the annular space 8 and the interior of the conduit means 5 and 10 filled with formation fracturing fluid, conventional formation fracturing operations may be commenced in an effort to induce the formation of fractures, i.e. cavities or openings, in the formation 4. Liquids employed for such fracturing operations are diverse in character and composition but are well known in the art.

When fracturing is to be commenced, the pump 11 is operated so as to apply pressure to fracturing fluid in the conduit means 5 and 10 and the annular space 8 of a magnitude estimated by conventional techniques as being sufficient to cause the fracturing of the formation 4. With pump 11 being of the reciprocating or positive displacement type, cyclic pressure impulses will be applied to the fluid body in the conduit means 5 and 10 which extends upwardly from and communicates with the formation 4.

The successful application of fracture pressure to fracturing fluid within the system schematically shown in FIGURE 1 will result in the formation of one or more fractures in the formation 4 communicating with the annular well bore space 8. One such fracture 13 is schematically shown in FIGURE 1 as extending generally laterally and radially away from the formation face 4a so as to provide a fracture space 14 occupied by fluid, including fracturing fluid and possibly some connate fluid, in communication with fluid in the space 8 and the interior of the conduit means 5 and 10.

As shown in FIGURE 5, when initial formation fracturing, i.e. breakdown, occurs, the fluid pressure within the fracturing system will drop abruptly from the high fracture pressure level X to a substantially lower value Y.

It has been empirically determined through field testing procedures that the obtaining of an initial fracture, i.e.

formation breakdown, may be confirmed by making appropriate measurements of the periods of oscillation of resonating bodies of fluid communicating with a zone which has been subjected to fracturing treatments.

In order to obtain such a confirmation of evaluation of a fracture attempt, a pressure impulse is imparted to fracturing fluid in the above-described system by the pump 11 before fracture breakdown occurs. This may be accomplished by merely operating the pump for a brief period of time and then abruptly shutting off the pump so that the last stroke of a fracturing fluid displacing piston within the pump imparts a terminal pressure impulse to the system. With the pump 11 shut off, and with a pressure impulse having been imparted to the fluid system, the fluid in the fracturing system will oscillate, i.e., undergo cyclic changes in pressure. By allowing this natural oscillation to continue, i.e., oscillation without interference from additionally applied pressure impulses, the fracturing fluid within the system will resonate. With the recorder 12 operating, the cyclic variations of pressure within the resonating fluid will be recorded on a chart as shown in FIGURE 5. As there shown, the variations in pressure are reflected on the ordinate of the illustrated graph while time is indicated on the abcissa.

As shown in FIGURE 5, a representative pressure wave cycle extends from pressure peak $A_1$ to pressure peak $A_2$. The period of resonant oscillation may be measured as the time increment $T_1$ between the pressure peaks $A_1$ and $A_2$.

After formation breakdown has occurred, the pump is again stopped so as to reimpart a terminal pressure impulse to fluid in the fracturing system. This fluid is allowed to resonate and a second period $T_2$ of resonant oscillation measured as shown in FIGURE 5. Through field observations and testing procedures, it has been empirically determined that the existence of initial fracturing, i.e., formation breakdown, is positively confirmed when the second measured period of oscillation $T_2$ exceeds the first measured period of oscillation $T_1$.

*Fracture enlarging*

After formation breakdown has occurred, it is generally desirable to raise the pressure in the system to the fracturing pressure level so as to induce enlargement of the fracture 13 formed at breakdown. If the attempt at fracture enlargement is successful, additional fracture space will be provided in the formation 4. This fracture space will be occupied by fluid including fracture fluid so as to, in effect, enlarge the total volume of fluid contained within the fracturing system. Thus, as shown schematically in FIGURE 2, the originally formed fracture 13, as a result of the fracture enlargement attempt, is schematically shown to have been enlarged to become the fracture 15 defining a fracture space 16 which is substantially greater in volume than the originally formed fracture space 14 shown in FIGURE 1. For the purpose of comparison, fracture 13 is shown in phantom line in FIGURE 2.

In performing a fracture enlargement operation, it is necessary to inject into the fracture system fluid sufficient in volume, pressure and input rate to cause the permanent distension of the fracture formed during breakdown.

In order to accomplish fracture enlargement, a quantity of fluid is injected into the fracturing system by operation of the pump means 11 so as to withdraw fracturing fluid from the supply conduit 11a and inject it under pressure into the system. As will be appreciated, pump means 11 will be operated so that the injected fluid is introduced into the system with the system being under a pressure of a magnitude estimated as being sufficient to cause fracture enlargement and the rate of fluid input sufficient to cause such enlargement. Such an addition of fluid to the system will induce permanent enlargement of the distensible formation fracture 13 if the fracture enlargement operation is successfully performed.

Through field operations and testing procedures it has been empirically determined that the minimum amount of fluid required to conduct a successful fracture enlargement operation may be predicted with reasonable accuracy by reference to prior fracture enlarging operations on other wells in an area. Such predictions are believed to be particularly reliable where the previously obtained empirical data involves formations similar to those to be treated and which are disposed a depth generally similar to the depth of the formations to be treated.

Through field observations and testing procedures, it has been found that the minimum amount of fluid to be injected into a fracturing system under a fracture enlargement pressure estimated as being sufficient to cause fracture enlargement may be determined as a function of the period of oscillation of resonating fluid in the fracturing system. Specifically, it has been empirically determined that the minimum amount of fluid required to be injected into a fracturing system to cause fracture enlargement is generally equal to a constant K times the quantity $(TD)^2/L$. In this formula, T is the period of oscillation of resonating fluid in the fracture system. T is measured as the period of oscillation of resonating fluid in the fracturing system after formation breakdown has occurred but before fracture enlargement is attempted. D is equal to the diameter of the fluid body which extends upwardly from the formation, i.e., the inner diameter of the conduit means 5. (In field operations conduit means 5 will be many times longer than conduit means 10, such that a difference in diameter of the portion of the fluid body in conduit means 5 with reference to the portion of the fluid body in the conduit means 10 is not of material significance for the purpose of this evaluation.) L is equal to the axial length of the fluid body extending upwardly from and communicating with the fracture zone. Thus, in the system schematically shown in FIGURE 1, the quantity L would be measured as being equal to the sum of the axial length $l_1$ of the conduit means 5 and the axial length $l_2$ of the conduit means 10.

Through field observations and testing procedures relating to fracturing operations, the minimum amount of fluid required to cause fracture enlargement may be determined. By measuring the period of oscillation of resonating fracturing systems after formation breakdown and by knowing the value of the quantities L and D, and the value of the minimum amounts of injected fluid, the constant K may be empirically determined.

It is believed that the constant K may be dependent to some extent upon formation characteristics, fluid loss additives contained in the fracturing fluid, and the flow rate of the injected fluid as well as the physical properties of the fracturing fluid itself such as viscosity. However, field observations indicate that the constant K will be generally accurate when used in connection with fracturing operations involving the same formation occurring at about the same depth in wells and where the fracturing pressure remains at about the same level.

Once the constant K has been determined through field observations in connection with a few wells in the area, it has been found through repeated observations of fracturing operations in an area in the vicinity of Duncan, Okla., that this constant may be employed to successfully determine the minimum amount of fracturing fluid to be injected into other wells to cause successful fracture enlargement. In order to determine this volume, it is merely necessary to measure the period of oscillation of resonating fluid in a fracture system after formation breakdown has occurred. The volume of fluid to be injected may then be determined as being generally equal to the previously empirically determined constant K times the quantity $(TD)^2/L$ where L, T and D are measured for the particular well to be subjected to a fracture enlargement attempt.

A prolonged period of field observations of fracturing operations performed on wells in the vicinity of Duncan, Okla., indicated that for these wells the constant K was approximately 17,000 where T is measured in seconds, D is measured in inches and L is measured in feet with V being determined as barrels of fracturing fluid to be injected into the fracturing system. This constant was derived for a fracturing fluid having a viscosity such that it transmitted sound at an approximate velocity of 4,400 feet per second.

Where a quantity of fluid substantially less than that determined by the above-indicated formula was injected into wells, fracture enlargement was not believed to have occurred. For example, fracture enlargement did not occur in one test where the amount of fluid injected was only about 93 percent of the volume computed by the formula set forth above.

It is believed that the measured period of oscillation of resonating fluid communicating with a formation might be able to be utilized mathematically in forms differing from that previously described. For example, it has been empirically found that the formula noted above may be employed to calculate the approximate volume of fluid contained within a system. In making this determination, an empirically determined constant K is employed which will yield a formula computed volume equal to total volume of fluid in the resonating system. For test wells in the vicinity of Duncan, Okla., this value of K was determined to be 4,700 when using the formula units above indicated and a fracturing fluid with a viscosity such that it transmitted sound at a speed of about 4,400 feet per second. By utilizing the measured period of oscillation of a resonating fracturing fluid system before formation breakdown and after breakdown but before fracture enlargement the volumes of the system before and after breakdown may be determined. By computing system volumes before and after breakdown, the volume of fracture space in a system may be determined. This determination may be made, of course, by merely subtracting the calculated volume before breakdown from calculated system volume after breakdown. In certain instances, it is believed that this fracture space volume may be utilized in estimating the amount of fluid to be injected into the well to cause fracture enlargement. It is believed that this estimate could be obtained by multiplying existing fracture space by a predetermined and empirically derived constant.

Field tests and observations indicate that after a fracture enlargement operation has been performed, the success or failure of the operation may be evaluated by comparing the measured period of oscillation of resonating fluid in the fracturing system before and after the fracture enlarging operation.

In performing this comparison, the period of oscillation of resonating fluid in the fracturing system is first measured after formation breakdown but before the fracture enlargement attempt.

The period of oscillation of resonating fluid in the fracturing system is measured for a second time after the fracture enlargement attempt. If the second measured period of oscillation of resonating fluid in the fracturing system is found to be larger than the first measured period of oscillation, successful fracture enlargement is confirmed.

It will be understood, of course, that fluid in the fracturing system will be caused to oscillate and allowed to resonate by merely interrupting pump means 11 as previously described.

Thus, after formation breakdown has occurred while the pump means 11 is operating, the pump means 11 may be abruptly shut down so as to cause natural oscillation or resonance of fluid in the fracturing system, and the above-described, first measured period of oscillation of this resonating fluid then recorded by the recorder 12. After the fracture enlarging attempt, the operating pump means 11 may again be abruptly shut down to resonate fluid in the fracturing system so as to enable the recorder 12 to record the above-described, second measured period of oscillation.

*Evaluation of relative characteristics of diverse formation zones*

FIGURES 3 and 4 illustrate a well bore 17 which intersects an upper formation 18 and a lower formation 19 which is vertically spaced from the formation 18. As illustrated, well bore 17 may be partially lined with a casing 20 which extends down to the top of the formation 18.

Formation 18 has an exposed face 18a in the well bore 17 while formation 19 has an exposed face 19a in the well bore.

FIGURE 3 schematically illustrates equipment positioned for the fracturing of the upper formation 18. The equipment to be employed for the fracturing of formation 18 is substantially the same as the equipment shown in FIGURE 1 and includes a conduit string 21 which extends downwardly from a well head, not shown, through the well bore 17 to communicate with the formation 18. It will be understood, of course, that at the well head the conduit string 21 will be connected with surface conduit means such as the conduit means 10 which will in turn be connected to a reciprocating pump such as the pump 11. The lower end of string 21 is closed.

The lower end of conduit string 21 may be provided with perforations or apertures 21a. Retrievable packers 22 and 23 may extend outwardly from the conduit string 21 so as to engage the well periphery and define an isolated annular zone 24 providing communication between the interior of the conduit string 21 and the formation face 18a as generally described in connection with the system in FIGURE 1.

Pressure is applied to fracturing fluid in the conduit string 21, which fracturing fluid defines at least a portion of a fluid body communicating with the zone 18 and extending upwardly therefrom. The pressure applied is of a magnitude estimated as being sufficient to cause fracturing of the first or upper formation zone 18.

If the fracturing attempt is successful, one or more fractures such as the illustrated fracture 25 will be formed in the formation 18. As illustrated, the fracture 25 will communicate with the well bore space 24 so as to provide a fluid occupied fracture space 26 communicating with fluid in the well bore space 24 and in the conduit string 21.

After the desired fracture is believed to be completed, the pump which applies pressure to the fracturing fluid is shut down so as to impart a terminal pressure impulse to fluid in the fracturing system which communicates with the zone 18. This fluid is allowed to resonate and the period of oscillation of this resonating fluid is measured by a recorder such as the recorder 12 described in connection with FIGURE 1.

After this first period of oscillation has been measured, the conduit string 21 and the retractable packers 22 and 23 may be repositioned so as to define an annular zone 27 which provides communciation between the interior of the conduit string 21 and the formation face 19a.

As is schematically shown in FIGURE 4, the repositioned conduit means 21 and the packers 22 and 23 will isolate fracturing fluid from direct contact with the first or upper formation 18. Thus, fracturing fluid within the conduit string 21 will extend upwardly from and communicate with the second zone 19 but will not communicate directly with the first zone 18.

In order to cause fracturing in the second zone 19. pressure is applied to fluid in the fracturing system of a magnitude estimated as being sufficient to cause fracturing of the second or lower zone 19. After it is believed that desired fracturing has been completed, the pressure applying pump is shut down so as to impart a terminal pressure impulse to the fracturing system which communicates with the zone 19. The fluid in this system is allowed to resonate and the period of oscillation of the resonating fluid recorded as above described.

By comparing the periods of oscillation measured of the resonating fluid communicating with the first zone 18 and the second zone 19, the relationship of fracturing, if any, in these two zones may be evaluated.

From field observations it is believed that the measurement of the period of oscillation of resonating fluid communicating with the zone 19 as being shorter than the period of oscillation of resonating fluid communicating with the zone 18 is indicative that fracturing 28 occurred in the zone 19 but that the fracture space 29 in zone 19 is less than fracture space 26 of the fracture 25 in the zone 18.

If the period of oscillation of resonating fluid communicating with the lower zone 19 exceeds the period of oscillation of resonating fluid communicating with the upper zone 18, a variety of conclusions are possible. Field observations are believed to justify the conclusion that if the zones 18 and 19 are in reasonably close proximity in comparison to the length of the conduit string 21, the larger value for the period of oscillation of resonating fluid communicating with the zone 19 is indicative that the application of pressure to fluid communicating with the zone 19 did cause subterranean fracturing. However, this fracturing may have involved only the formation 19 or may also have caused vertical fracturing 31 extending to the formation 18 so as to cause fracturing or the enlargement of fracture space in the formation 18.

Where the two zones 18 and 19 are in relatively close proximity when viewed in the perspective of the overall length of the conduit string 21, the measurement of substantially identical periods of oscillation of resonating fluid communicating with the upper and lower zones 18 and 19, respectively, is considered as indicative that the formations 18 and 19 are in fluid communication and that no substantial fracturing of the zone 19 occurred. Such communication might be provided, for example, through pre-existing vertical passages, or vertical passages formed while attempting to fracture the zone 19. Such communication might also result through failure of the packer 22 which would allow fracturing fluid to move directly through the well bore between the formations 19 and 18.

SUMMARY

In retrospect, it will be appreciated that the underlying concept common to the several previously described, individually unique and significant, formation evaluation techniques involves a method of determining the characteristics of subterranean formations as a function of measured periods of oscillation of resonating fluid bodies communicating with such formations. Characteristics which may be thus determined include the amount of fluid to be injected into a fracturing system to cause formation fracturing as well as the confirmation of formation breakdown and fracture enlargement. In multiple fracture zone wells, relative characteristics of diverse zones may be evaluated.

In many instances the information derived through the techniques presented through this invention are empirical or qualitative in character. In other instances such as when the volume of fluid to cause fracture enlargement is being determined, quantitative information is derived.

As will be appreciated, the period of oscillation of resonating fluid is dependent in part upon the viscosity of the fracturing fluid. For this reason, where empirical constants are being utilized or where comparisons are being made between wells or zones within a well, the same fracturing fluid should be employed in obtaining all measurements.

It is recognized that the nature of this invention is such as to preclude precise mathematical accuracy in many instances. Thus the accuracy and reliability of the information obtained through the techniques of this invention may vary from area to area. However, the techniques which have been herein presented are sufficiently reliable for most field operations. The inherrent errors involved in ignoring minor differences in diameter of portions of conduits containing fracturing fluid and in ignoring or discounting relatively minor portions of the axial length of resonating fluid bodies or the effective length of such portions are difficult to evaluate but are not believed to be such as to materially interfere with the practical utilization of the invention.

The advantages of the techniques presented through the invention are substantial. The amounts of fracturing fluid utilized to cause fracture enlargements may be determined in advance and minimized. The extent to which formations are infiltrated by foreign fluids may be minimized. The success of fracturing operations and relative characteristics of diverse fracturing zones may be evaluated in a timely fashion so that remedial action, if necessary, may be conveniently undertaken.

In describing the invention reference has been made to preferred method embodiments. However, those skilled in the formation fracturing and well evaluation art and familiar with the disclosure of this invention may well recognize additions, deletions, substitutions or other modifications with reference to the disclosed techniques which would fall within the purview of the invention as defined in the appended claims.

I claim:

1. A method of enlarging fractures in subterranean formations, said method comprising:
    providing a body of fluid contained at least partially in a well and extending upwardly from and communicating with fluid in a formation fracture;
    imparting a pressure impulse to said fluid body to cause oscillation thereof;
    allowing said fluid body to resonate;
    measuring a function of the period of oscillation of said resonating fluid; and
    injecting into said well, in communication with said fluid body and under pressure of a magnitude estimated as being sufficient to cause the enlargement of said fracture, a volume of fluid determined as a function of said measured period of oscillation.

2. A method of enlarging fractures in subterranean formations, said method comprising:
    providing a body of fluid contained at least partially in a well and extending upwardly from and communicating with fluid in a formation fracture with said body being of circular cross sectional configuration;
    imparting a pressure impulse to said fluid to cause oscillation thereof;
    allowing said fluid to resonate;
    measuring a function of the period of oscillation of said resonating fluid; and
    injecting into said well, in communication with said fluid body and under pressure of a magnitude estimated as being sufficient to cause the enlargement of said fracture, a volume of fluid generally equal to $K$ times the quantity $(TD)^2/L$ where $K$ is a constant previously empirically determined to be a multiplier of the quantity $(TD)^2/L$ to yield a product generally corresponding to a volume of said fluid required to be injected into a well to cause fracture enlargement, $T$ is equal to the period of oscillation of said fluid, $D$ is equal to the diameter of said fluid body, and $L$ is equal to the axial length of said fluid body.

3. A method of determining an amount of fluid to be introduced into a well to enlarge at least one fracture in a subterranean formation, said method comprising:
    providing a body of fluid contained at least partially in a well and extending upwardly from and communicating with fluid in a formation fracture;
    imparting a pressure impulse to said fluid body to cause oscillation thereof;

allowing said fluid body to resonate;
measuring a function of the period of oscillation of said resonating fluid; and
determining, as a function of said measured period of oscillation, an amount of fluid to be injected into said well in communication with said fluid body and under pressure of a magnitude estimated as being sufficient to cause the enlargement of a fracture in said subterranean formation.

4. A method of determining an amount of fluid to be introduced into a well to enlarge at least one fracture in subterranean formation, said method comprising:
providing a body of fluid contained at least partially in a well and extending upwardly from and communicating with fluid in a formation fracture with said body being of circular cross-sectional configuration;
imparting a pressure impulse to said fluid to cause oscillation thereof;
allowing said fluid to resonate;
measuring a function of the period of oscillation of said resonation fluid; and
determining, as a function of said measured period of oscillation, the amount of fluid to be injected into said well in communication with said fluid body and under pressure of a magnitude estimated as being sufficient to cause the enlargement of a fracture in said subterranean formation, said volume of fluid being determined as being equal to K times the quantity $(TD)^2/L$ where K is a constant previously determined to be a multiplier of the quantity $(TD)^2/L$ to yield a product generally corresponding to a volume of said fluid required to be injected into a well to cause fracture enlargement, T is equal to the period of oscillation of said fluid, D is equal to the diameter of said fluid body, and L is equal to the axial length of said fluid body.

5. A method of predicting relationships between vertically spaced zones of subterranean formations, said method comprising:
providing a body of fluid contained at least partially in a well and extending upwardly from and communication with a first, subterranean formation zone;
applying pressure to said fluid body communicating with said first zone of a magnitude estimated as being sufficient to cause fracturing of said first zone;
imparting a pressure impulse to said fluid body communicating with said first zone to cause oscillation of said body;
allowing said fluid body communicating with said first zone to resonate;
measuring a function of a first period of oscillation of said resonating fluid body communicating with said first zone;
providing a body of said fluid, isolated from direct contact with said first zone in said well, and extending upwardly from and communicating with a second subterranean formation zone vertically spaced from said first zone;
applying pressure to said fluid in said fluid body communicating with said second zone of a magnitude estimated as being sufficient to cause fracturing of said second zone;
imparting a pressure impulse to said fluid body communicating with said second zone to cause oscillation of said body;
allowing said fluid body communicating with said second zone to resonate;
measuring a function of a second period of oscillation of said resonating fluid body communicating with said second zone; and
determining the relationship of fracturing in said first and second zones as a function of the relation between the first and second measured functions of periods of oscillation of fluid communicating with said first and second zones respectively.

6. A method of evaluating attempts to fracture subterranean formations, said method comprising:
providing a body of fluid contained at least partially in a well and extending upwardly from and communicating with a formation to be fractured;
imparting a first pressure impulse to said fluid to cause oscillation thereof;
allowing said fluid to resonate;
measuring a function of a first period of oscillation of said resonating fluid;
injecting a quantity of said fluid into said well, in communication with said fluid body and under pressure of a magnitude estimated as being sufficient to cause fracturing of said formation;
thereafter imparting a second pressure impulse to said fluid to cause oscillation thereof;
allowing said fluid to resonate;
measuring a function of a second period of oscillation of said resonating fluid; and
evaluating the possibility of fracturing in said formation as a function of the relationship of said measured function of said second period of oscillation to said measured function of said first period of oscillation.

7. A method of evaluating characteristics of subterranean formations, said method comprising:
providing a body of fluid contained at least partially in a well and extending upwardly from and communicating with a subterranean formation;
imparting a pressure impulse to said body of fluid to cause oscillation thereof;
allowing said fluid to resonate;
measuring a function of the period of oscillation of said resonating fluid;
determining a characteristic of said formation as a function of said measured functions of said period of oscillation;
prior to said determining of said formation characteristic, imparting another pressure impulse to fluid contained at least partially in said well;
following said imparting of said other pressure impulse, allowing fluid in said well to resonate; and
measuring a function of the period of oscillation of fluid resonating in response to said imparting of said other impulse;
said determining of said characteristic being effected as a function of the relationship between said measured functions of said periods of oscillation.

References Cited

UNITED STATES PATENTS

| | | | |
|---|---|---|---|
| 2,235,770 | 3/1941 | McConnell | 73—149 |
| 2,666,326 | 1/1954 | Poole et al. | 73—149 |
| 2,915,122 | 12/1959 | Hulse | 166—42 |
| 3,048,226 | 8/1962 | Smith | 166—42 |

OTHER REFERENCES

Why Should I Fracture My Well . . . and How? The Oil and Gas Journal Tulsa, Okla., Petroleum Pub. Co., 1957.

JAMES A. LIPPINK, *Primary Examiner.*

IAN A. CALVERT, *Assistant Examiner.*

U.S. Cl. X.R.

166—308, 315; 73—151